United States Patent [19]

Utsumi et al.

[11] Patent Number: 5,093,064

[45] Date of Patent: * Mar. 3, 1992

[54] LOW-SHRINKAGE POLYESTER FILM AND PREPARATION THEREOF

[75] Inventors: Shigeo Utsumi, Yamato; Kichinojo Tomitaka, Yokohama; Tomoyuki Kotani, Machida; Masumi Koizumi, Kawasaki, all of Japan

[73] Assignee: Diafoil Company, Ltd., Tokyo, Japan

[ * ] Notice: The portion of the term of this patent subsequent to Jan. 15, 2008 has been disclaimed.

[21] Appl. No.: 536,115

[22] Filed: Jun. 11, 1990

[30] Foreign Application Priority Data

Jun. 13, 1989 [JP] Japan .................. 1-150162
Jun. 22, 1989 [JP] Japan .................. 1-159956

[51] Int. Cl.$^5$ .................. B29C 55/12; C08G 63/02
[52] U.S. Cl. .................. 264/210.7; 264/211.12; 264/235.8; 264/342 RE; 428/910; 525/437; 525/444; 528/272; 528/304; 528/306; 528/308; 528/308.2; 528/308.6
[58] Field of Search .................. 264/177.17, 177.19, 264/210.7, 235.8, 342 R, 342 RE, 345, 346, 211.12; 428/480, 910; 525/437, 444; 528/272, 304, 306, 308, 308.1, 308.6, 308.2

[56] References Cited

U.S. PATENT DOCUMENTS

| | | | |
|---|---|---|---|
| 3,873,664 | 3/1975 | Curtis et al. .................. | 264/235.8 X |
| 4,042,569 | 8/1977 | Bell et al. .................. | 528/272 |
| 4,587,071 | 5/1986 | Minami et al. .................. | 264/210.7 |
| 4,677,188 | 6/1987 | Utsumi et al. .................. | 528/272 |
| 4,939,232 | 7/1990 | Fukuda et al. .................. | 528/272 |
| 4,985,537 | 1/1991 | Utsumi et al. .................. | 528/272 |

FOREIGN PATENT DOCUMENTS 62-134244 6/1987 Japan .................. 264/342 RE

Primary Examiner—Leo B. Tentoni
Attorney, Agent, or Firm—Oblon, Spivak, McClelland, Maier & Neustadt

[57] ABSTRACT

A biaxially oriented polyester film simultaneously satisfying the following formulas (I) to (III):

$$|S_{180} - S_{120}| \leq 54 \qquad \text{(I)}$$

$$T_S^{MD} \geq 100 \qquad \text{(II)}$$

$$Q_{120} \leq 0.7 \qquad \text{(III)}$$

wherein $S_{180}$ is shrinking stress (g/mm$^2$) of the film in the machine direction at 180° C., $S_{120}$ is shrinking stress (g/mm$^2$) of the film in the machine direction at 120° C., $T_S^{MD}$ is shrinkage initiation temperature (°C.) of the film in the machine direction, and $Q_{120}$ is shrinkage (%) of the film in the machine direction after 5 hours' treatment at 120° C., is described. The film has a good dimensional stability due to its low shrinkage, particularly in the machine direction, and substantially free from defect such as wave and wrinkle.

It is prepared by biaxially stretching, heat-setting and relaxing an extruded polyester film under particular conditions so as to obtain a biaxially oriented polyester film having these characteristics.

5 Claims, No Drawings

ND PREPARATION THEREOF

LOW-SHRINKAGE POLYESTER FILM AND PREPARATION THEREOF

BACKGROUND OF THE INVENTION

The present invention relates to a low-shrinkage polyester film exhibiting an extremely low shrinkage in the machine direction, free from defects such as wave, wrinkle and loosing, and excellent in flatness. More particularly, the present invention relates to a polyester film which is useful as a circuit board for a membrane switch, a flexible printed circuit board, etc. and as an electric insulator for a heat connector, flyback transformer, etc.

A biaxially stretched polyester film is excellent in heat resistance, mechanical strength and chemical resistance, and has been used in various fields including magnetic recording media.

In the utilities of biaxially stretched polyester film, especially in the utilities as electric insulators, substrate for floppy disks, substrate for vertical magnetic recording media, substrate for liquid crystal panel, circuit boards for membrane switches, etc. the film has been required to be low in shrinkage in both the machine and transverse directions so as to avoid deformation due to heat and moisture during the course of production or practical use of the film.

The present inventors have found as a result of the continuous investigation that a film simultaneously satisfying the specific conditions meets with the above purpose. The present invention has been accomplished based on this findings.

SUMMARY OF THE INVENTION

The present invention provides a biaxially oriented polyester film simultaneously satisfying the following formulas (I) to (III):

$$|S_{180} - S_{120}| \leq 54 \tag{I}$$

$$T_s^{MD} \geq 100 \tag{II}$$

$$Q_{120} \leq 0.7 \tag{III}$$

wherein $S_{180}$ is shrinking stress (g/mm$^2$) of the film in the machine direction at 180° C., $S_{120}$ is shrinking stress (g/mm$^2$) of the film in the machine direction at 120° C., $T_s^{MD}$ is shrinkage initiation temperature (°C.) of the film in the machine direction, and $Q_{120}$ is shrinkage (%) of the film in the machine direction after 5 hours' treatment at 120° C.

DETAILED DESCRIPTION OF THE INVENTION

The polyester used in the present invention is a crystalline aromatic polyester which can be obtained by polycondensing an aromatic dicarboxylic acid component such as terephthalic acid, isophthalic acid, naphthalene-2,6-dicarboxylic acid and an ester of these dicarboxylic acid and a diol component such as ethylene glycol, polyethylene glycol including diethylene glycol, tetramethylene glycol and neopentyl glycol. Besides being obtained by directly polycondensing an aromatic dicarboxylic acid with a diol, the polyester can be also obtained by a method wherein a dialkyl ester of an aromatic dicarboxylic acid and a diol is first subjected to ester interchange and then subjected to polycondensation, or a method wherein a diglycol ester of an aromatic dicarboxylic acid is subjected to polycondensation.

Typical example of the polyester includes polyethylene terephthalate, polyethylene 2,6-naphthalate, polytetramethylene terephthalate and polytetrametylene 2,6-naphthalate. These polyesters include each homopolyester as well as each copolyester wherein not less than 80 mol % of the constitutional repeating units is ethylene terephthalate unit, ethylene 2,6-naphthalate unit, tetramethylene terephthalate unit, and tetramethylene 2,6-naphthalate unit, respectively. As the copolymerized component, the dicarboxylic acids and glycol described above may be used, and especially, a copolyester containing polyalkylene glycol such as polyethylene glycol and polytetramethylene glycol as the copolymerized glycol component is preferred. The preferred polyester is one having an intrinsic viscosity [$\eta$] of 0.4 to 0.9.

The polyester used in the present invention may include a polyester mixture comprising the polyester as described above and another polymer. The polymer is mixed with the polyester in such an amount that the properties of the polyester is not substantially changed. A polyolefin, a polyamide, a polycarbonate, and other polyester may be added to the polyester in a proportion of less than 15 wt % based on the polyester.

The polyester may contain fine inactive particles which act as slipping agent, if necessary. The content of the fine inactive particles is usually 0.005 to 2 wt % based on the polyester and the average particle size thereof is usually in the range of from 0.005 to 5.0 μm.

As the fine inactive particles usable in the present invention, may be exemplified a high melting point organic compound infusible during melting step and film-forming step of the polyester; a cross-linked polymer; internal deposited particles formed in the polyester during the production of the polyester from a metal compound, such as alkali metal compounds and alkaline earth metal compounds, used as a catalyst for the polyester production; and external additive particles such as MgO, ZnO, MgCO$_3$, BaSO$_4$, Al$_2$O$_3$, SiO$_2$, TiO$_2$, SiC, LiF, talc, clay mineral such as kaoline, sellaite, mica, terephthalates of Ca, Ba, Zn or Mn.

Inactive organic compounds such as a metallic soap, starch, carboxymethyl cellulose, etc. may be also used as the fine inactive particles.

The polyester, if necessary, may contain in addition to the fine inactive particles such additive as a dye, a pigment, an antistatic agent, an electroconductive substance, a magnetic substance, an antioxidant, a defoaming agent, etc.

The polyester film of the present invention is produced by biaxially stretching the polyester described above and heat setting the biaxially stretched polyester film. The polyester film of the present invention is required to simultaneously satisfy the following formulas (I) to (III):

$$|S_{180} - S_{120}| \leq 54 \tag{I}$$

$$T_s^{MD} \geq 100 \tag{II}$$

$$Q_{120} \leq 0.7 \tag{III}$$

wherein $S_{180}$ is shrinking stress (g/mm$^2$) of the film in the machine direction at 180° C., $S_{120}$ is shrinking stress (g/mm$^2$) of the film in the machine direction at 120° C., $T_s^{MD}$ is initiation temperature (°C.) of machine direction shrinkage, and $Q_{120}$ is shrinkage (%) of the film in the machine direction after 5 hours' treatment at 120° C.

A film which fails to satisfy the formulas (I) and (II) is undesirable because it suffers from degradation in its flatness due to heating during the production.

The value of $|S_{180} - S_{120}|$ (g/mm$^2$) is preferably not higher than 40, more preferably not higher than 14.

A film which fails to satisfy the formula (III) is undesirable because the shrinkage of the film cannot be lowered sufficiently by off-line heat treatment and the film is too poor in dimentional stability to be used practically. The value of $Q_{120}$ is preferably not higher than 0.6%, more preferably not higher than 0.5%, and particularly preferably not higher than 0.3%.

The shrinkage of the film in the machine direction after 30 minutes' treatment at 180° C. ($Q_{180}$) is preferably not higher than 1.3%, more preferably not higher than 1.0, and particularly preferably not higher than 0.7.

The shrinkage of the film, subjected to off-line heat treatment, in the machine direction after 30 minutes' treatment at 180° C. is preferably not higher than 0.5%, more preferably not higher than 0.4%, and particularly preferably 0.3%.

The initiation temperature of the machine direction shrinkage ($T_s^{MD}$) of the film is preferably not lower than 110° C., more preferably not lower than 130° C., and particularly preferably not lower than 150° C. The initiation temperature of the transverse direction shrinkage ($T_s^{TD}$) is preferably from 190° to 245° C., more preferably from 210° to 240° C., and particularly preferably from 220° to 235° C.

The degree of planar orientation ($\Delta P$) of the film is preferably from 0.155 to 0.165. When the $\Delta P$ exceeds 0.165, the film is inferior in dimensional stability, and insufficient in mechanical strength when the $\Delta P$ is less than 0.155.

The average refractive index ($\bar{n}$) of the film is preferably from 1.6050 to 1.6100, more preferably from 1.6070 to 1.6090. A film of an average refractive index less than 1.6050 is inferior in dimensional stability and insufficient in mechanical strength when exceeds 1.6100.

In the film of the present invention, it is preferred that the refractive index in the machine direction ($n_{MD}$) is smaller than the refractive index in the transverse direction ($n_{TD}$). When the values of $\Delta P$ are the same, a film wherein $n_{MD}$ is smaller than $n_{TD}$ is more preferred in view of dimensional stability.

The thickness unevenness ($R_p^5$ (%)) is preferably not more than 5%, more preferably not more than 3%.

The film simultaneously satisfying the formulas (I) to (III) is highly suitable as a low-shrinkage polyester film, and the film can be produced by a method exemplified below.

A polyester described above is produced according to a known method while adding, if necessary, fine inactive particles such as kaolin, silica, calcium carbonate, aluminum oxide, etc., stabilizer, coloring agent, defoaming agent, organic lubricant, etc. during the production process thereof. The polyester obtained is dried in a conventional manner and extruded at 270° to 300° C. from an extruder and cooled and solidified on a rotating cooling drum to obtain an amorphous sheet. This cooling and solidification step is preferred to be effected by a known electrostatic cooling method. The amorphous sheet is sufficiently preheated and then is subjected to one-stage or multi-stage stretching in the machine direction at a temperature from 80° to 120° C., preferably from 88° to 95° C., in a stretch ratio from 2.5 to 4.5 times, preferably from 2.6 to 3.3 times. The sheet is preferred not to be cooled under the glass transition temperature ($T_g$) except for cooling by the end cooling roller, when multi-stage stretching is employed. The birefringence ($\Delta n$) of the film after the machine direction stretching is preferably not more than 0.080, more preferably not more than 0.060, and particularly preferably 0.055.

The film thus stretched in the machine direction is then stretched in the transverse direction at a temperature from 80° to 140° C., preferably from 85° to 110° C., in a stretch ratio from 3.3 to 4.5, preferably from 3.3 to 4.0 to obtain a biaxially stretched film. The biaxially stretched film is subjected to heat setting at a temperature from 225° to 260° C., preferably from 230° to 255° C., for 1 sec to 10 min. In the heat-setting zone, the film is preferred to be subjected to 1 to 15% relaxation in the transverse direction. In the subsequent cooling zone, the film is subjected to 0.01 to 10% relaxation at a temperature lower than 180° C. in the machine and/or transverse direction. Then the biaxially oriented film thus heat-set is wound up.

A film having a further low shrinkage can be obtained by subjecting the thus obtained biaxially oriented film to off-line heat treatment. The method for off-line heat treatment is not specifically restricted in the present invention. For example, a method wherein a film cut into predetermine size is heat-treated in an oven at 120° to 180° C. for 10 sec to 10 min or a method wherein a continuous film is heat-treated at 120° to 180° C. for 10 sec to 10 min while taking up the film with a take-up tension from 1 to 150 g/mm$^2$ may be employed. A heat treatment temperature less than 120° C. gives no sufficient reduction in the shrinkage, and the flatness of the film is impaired when the temperature exceeds 180° C. A heat treatment shorter than 10 sec gives no sufficient reduction in the shrinkage, and longer heat treatment than 10 min impairs the flatness of the film as well as the film-productivity.

According to the method as described above, the film of the present invention which is superior in dimensional stability as well as flatness can be obtained.

The film thickness depend on the utility thereof, but usually 10 to 500 μm, preferably 20 to 250 μm, more preferably 50 to 125 μm.

The present invention will be described more specifically with reference to the following non-limitative examples. The properties of films mentioned below were determined by the following methods.

(1) Shrinking Stress and Initiation Temperature of Shrinkage

The determination was carried out under the following conditions by using a tensile tester "Intesco Model 2001" (produced by Intesco K.K.) equipped with a thermo-humidistat chamber. The shrinking stress was obtained by dividing the found actual load by the cross-sectional area of the sample film.

Temperature for determination: room temperature to 250° C.

Temperature increasing rate: 4° C./min

Sample size: 200 mm length × 10 mm width

The temperature dependency of the stretching stress was determined in the same procedure as above in each of the machine and transverse directions. The temperature at which the shrinking stress curve as a function of temperature rises steeply was reported as the initiation temperature of shrinkage.

(2) Shrinkage

A film was cut into 50 cm length ($L_O$) in the machine or transverse direction and 15 mm width to obtain a sample film. After heat-treating the sample film in an oven at a given temperature for a predetermined time period, the length (L) of the sample film was measured. The shrinkage was calculated from the following expression.

$$\text{Shrinkage (\%)} = \frac{L_0 - L}{L_0} \times 100$$

(3) Refractive Indices in the Machine Direction ($n_{MD}$) and in the Transverse Direction ($n_{TD}$)

The refractive indices of a sample film in the machine direction and the transverse direction using a Na-D ray were measured at 23° C. by an Abbe's refractometer produced by Atago Kogaku K.K.

(4) Degree of Planar Orientation (ΓP)

The maximum refractive index ($n_\gamma$) in the plane of a sample film, the refractive index ($n_\beta$) in the direction perpendicular to the direction of the maximum refractive index, and the refractive index ($n_\alpha$) in the thickness direction of the film were measured by an Abbe's refractometer produced by Atago Kogaku K.K. The degree of planar orientation was calculated from the following formula using the results of measurement. The measurement of the refractive indices was carried out with sodium D ray at 23° C.

$$\text{Degree of planar orientation } (\Delta P) = \frac{(n_\gamma + n_\beta)}{2} - n_\alpha$$

(5) Average Refractive Index ($\bar{n}$)

The average refractive index of a sample film was obtained from the following formula:

$$\bar{n} = \tfrac{1}{3}(n_\alpha + n_\beta + n_\gamma)$$

wherein $n_\alpha$, $n_\beta$, and $n_\gamma$ are as defined above, and measured in the same manner as in (4).

(6) Unevenness of Thickness ($R_p^5$)

The thickness of a sample film along the machine direction of the film was measured over 5 mm long by a continuos film thickness measurement apparatus (using an electronic micrometer) produced by Anritsu Denki Co., Ltd. The unevenness of thickness was calculated from the following formula.

$$\text{Unevenness of thickness (\%)} = \frac{\text{Maximum thickness} - \text{Minimum thickness}}{\text{Average thickness}} \times 100$$

(7) Flatness

An electroconductive circuit was formed on a sample film thereby forming a membrane switch and the appearance of the film was visually observed. The flatness of a sample film was evaluated by the following ratings.

X: Heavy occurrence of wave and wrinkle
Δ: Occurrence of wave and wrinkle is noticed by careful observation
 : Absence of occurrence of wave or wrinkle
⊚: Highly satisfactory

(8) Displacement of Circuit

The displacement of circuit of a sample film was evaluated on a membrane switch produced by following the same procedure of (7). The result of the evaluation was shown by   when desirable and × when unduly large displacement was occurred.

EXAMPLE 1

Method for Production of Polyester Chips

In a reaction vessel, were placed 100 parts of dimethyl terephthalate, 70 parts of ethylene glycol, and 0.07 part of calcium acetate monohydrate. The content was heated to effect ester interchange reaction while distilling off the methanol. The temperature of the reaction system was elevated to 230° C. over a period of about four and a half hours to complete the ester interchange reaction. Then, after adding 0.04 part of phosphoric acid and 0.035 part of antimony trioxide, the polymerization by conventional method was carried out. During the polymerization, the reaction temperature was gradually elevated to the final temperature of 280° C. and the pressure was gradually reduced to the final level of 0.5 mmHg. The polymerization was continued for four hours. The resultant polymer was made into chips by a conventional method to obtain Polyester (A).

Separately, amorphous silica-containing polyester (B) was obtained by following the procedure for the production of Polyester (A), except that 0.13 part of amorphous silica having an average particle size of 1.5 μm was added after completion of the ester interchange reaction.

Amorphous silica-containing polyester (C) was obtained by following the procedure for the production of Polyester (B), except that the amorphous silica having an average particle diameter of 30 nm was added in an amount of 0.10 part.

The intrinsic viscosities [η] of the polyesters (A), (B), and (C) were 0.63.

Method for Production of Film

The polyester (A), the polyester (B), and the polyester (C) were blended in a ratio of 55:5:40. The polyester blend was dried by a conventional method, melt extruded at 285° C., and cooled and solidified to obtain an amorphous sheet.

The amorphous sheet was amply preheated to 100° C. by the rolls, stretched 2.3 times the original length in the machine direction at a film temperature of 95° C., and then, without allowing the film to cool below its glass transition point ($T_g$), further stretched 1.5 times in the machine direction at a film temperature of 93° C. The resultant film possessed a birefringence (Δn) of 0.048. The resultant film was stretched 3.6 times in the transverse direction with a tenter at 95° C. and heat-set at 235° C. while being relaxed 8% in the transverse direction. In the subsequent cooling zone, the film was further relaxed 3% at 130° C. in the transverse direction. Then, the film was taken up with 0.06% relaxation in the machine direction to obtain a biaxially oriented polyester film of 75 μm thickness.

EXAMPLE 2

A biaxially oriented polyester film was produced by following the procedure of Example 1, except that the heat setting with relaxation was carried out at 200° C.

EXAMPLE 3

A biaxially oriented polyester film was produced by following the procedure of Example 1, except that the stretching in the machine direction was effected at 85° C. in a stretch ratio of 3.3 times and the heat-setting temperature was changed to 242° C.

COMPARATIVE EXAMPLE 1

A biaxially oriented polyester film was produced by following the procedure of Example 3, except that the relaxation in the machine direction was omitted.

COMPARATIVE EXAMPLE 21

A biaxially oriented polyester film was produced by following the procedure of Comparative Example 1, except that the stretching in the machine direction was effected at 85° C. in a stretch ratio of 3.5 times and the heat-setting temperature was changed to 231° C.

COMPARATIVE EXAMPLE 3

A biaxially oriented polyester film was produced by following the procedure of Comparative Example 1, except that the heat-setting temperature was changed to 235° C. and the relaxation during heat setting was omitted.

COMPARATIVE EXAMPLE 4

A biaxially oriented polyester film was produced by following the procedure of Example 3, except that the heat-setting temperature was changed to 235° C. and the relaxation during heat setting was omitted.

Comparative Example 5

A biaxially oriented polyester film was produced by following the procedure of Example 3, except that the heat-setting temperature was changed to 200° C.

The results of evaluation on the films obtained above are collectively shown in Table 1.

EXAMPLE 4

The polyester (A), Polyester (B), and Polyester (C) were blended in a ratio of 55:5:40. The polyester blend was dried by a conventional method, melt extruded at 285° C., and cooled and solidified to obtain an amorphous sheet.

The amorphous sheet was amply preheated to 105° C. by rolls, stretched 2.25 times in the machine direction at a film temperature of 90° C., and then, without allowing the film to cool below the glass transition point thereof, stretched 1.55 times in the machine direction at a film temperature of 90° C. The resultant film had a birefringence of 0.050. The stretched film thus obtained was stretched 3.7 times in the transverse direction with a tenter at 125° C., and heat-set at 235° C. with 7% relaxation in the transverse direction. In the next cooling zone, the film was relaxed 0.05% in both the machine and transverse directions at a temperature not exceeding 180° C. and taken up in a roll, to obtain a biaxially oriented polyester film of 75 μm thickness. Then, the biaxially oriented heat-set film was cut into pieces of 500 mm × 60 mm. The pieces of film were passed one by one through an oven kept at a temperature of 150° C. as carried on a belt conveyor to undergo the heat treatment for 40 seconds. A film having further lower shrinkage was obtained.

EXAMPLE 5

A film of 75 μm thickness was obtained by following the procedure of Example 4, except that the heat-setting temperature was changed to 240° C. and the machine direction relaxation in the cooling zone was replaced by 0.1% machine direction stretching. Then, the film was subjected to the same off-line heat treatment as in Example 4.

EXAMPLE 6

A film of 75 μm thickness was obtained by following the procedure of Example 5, except that the heat-setting temperature was changed to 233° C. Then, the film was subjected to the same off-line heat treatment as in Example 5.

COMPARATIVE EXAMPLE 6

A film of 75 μm thickness was obtained by following the procedure of Example 5, except that the machine direction stretching was carried out at 85° C. in a stretch ratio of 3.5 times and the relaxation during the heat setting was omitted. Then, the film was subjected to the off-line heat treatment.

COMPARATIVE EXAMPLE 7

A film was obtained by following the procedure of Comparative Example 6, except that 0.2% relaxation in

TABLE 1

| | | | | | Properties of film | | | | | | | After processing | |
|---|---|---|---|---|---|---|---|---|---|---|---|---|---|
| | $\Delta n$ | $\Delta P$ | $n_{TD}-n_{MD}$ | $\bar{n}$ | $R_p^5$ (%) | $|S_{180} - S_{120}|$ (g/mm²) | $Q_{120}$ (°C.) | $Q_{180}$ (°C.) | $T_s^{MD}$ (°C.) | $T_s^{TD}$ (°C.) | | Flatness | Displacement of circuit |
| Example 1 | 0.048 | 0.158 | 0.022 | 1.6072 | 2.8 | 0 | 0.2 | 0.7 | 160 | 233 | | ○ | ○ |
| Example 2 | 0.048 | 0.161 | 0.025 | 1.6068 | 3.2 | 0 | 0.3 | 0.8 | 150 | 192 | | ○ | ○ ~ Δ |
| Example 3 | 0.072 | 0.163 | 0.012 | 1.6075 | 4.6 | 0 | 0.4 | 0.9 | 160 | 238 | | ○ | ○ ~ Δ |
| Comparative Experiment 1 | 0.083 | 0.163 | 0.012 | 1.6075 | 3.8 | 0 | 0.8 | 1.1 | 160 | 238 | | ○ | X |
| Comparative Experiment 2 | 0.083 | 0.160 | 0.008 | 1.6061 | 3.8 | 11 | 0.8 | 1.5 | 100 | 229 | | ○ | X |
| Comparative Experiment 3 | 0.083 | 0.165 | 0.025 | 1.6075 | 3.6 | 80 | 0.8 | 1.8 | 100 | 191 | | X | X |
| Comparative Experiment 4 | 0.083 | 0.168 | 0.028 | 1.6067 | 3.9 | 67 | 0.5 | 1.6 | 130 | 188 | | X | X |
| Comparative Experiment 5 | 0.083 | 0.160 | 0.005 | 1.6000 | 3.2 | 107 | 0.5 | 2.5 | 100 | 195 | | X | X | the machine direction was effected in the cooling zone subsequent to the heat setting.

The results of evaluation on the films obtained above are collectively shown in Table 2.

TABLE 2

| | Before off-line heat treatment | | | | | | | After off-line heat treatment | |
|---|---|---|---|---|---|---|---|---|---|
| | Δn | $\|S_{180} - S_{120}\|$ (g/mm$^2$) | $T_s^{MD}$ (°C.) | $Q_{120}$ (%) | $n_\alpha$ | ΔP | $\bar{n}$ | $Q_{180}$ (%) | Flatness |
| Example 4 | 0.050 | 0 | 160 | 0.2 | 1.496 | 0.161 | 1.6065 | 0.3 | ⊙ |
| Example 5 | 0.050 | 0 | 170 | 0.4 | 1.498 | 0.158 | 1.6071 | 0.2 | ○ |
| Example 6 | 0.050 | 20 | 105 | 0.6 | 1.496 | 0.161 | 1.6065 | 0.3 | △ |
| Comparative Example 6 | 0.083 | 80 | 130 | 0.7 | 1.491 | 0.170 | 1.6065 | 0.6 | X |
| Comparative Example 6 | 0.083 | 56 | 95 | 0.4 | 1.492 | 0.170 | 1.6065 | 0.5 | X |

What is claimed is:

1. A biaxially oriented polyester film simultaneously satisfying the following formulas (I) to (III):

$$|S_{180} - S_{120}| \leq 54 \quad (I)$$

$$T_s^{MD} \geq 100 \quad (II)$$

$$Q_{120} \leq 0.7 \quad (III)$$

Wherein $S_{180}$ is shrinking stress (g/mm$^2$) of the film in the machine direction at 180° C., $S_{120}$ is shrinking stress (g/mm$^2$) of the film in the machine direction at 120° C., $T_s^{MD}$ is shrinkage initiation temperature (°C.) of the film in the machine direction, and $Q_{120}$ is shrinkage (%) of the film in the machine direction after 5 hours' treatment at 120° C.

2. A film according to claim 1, wherein the shrinkage ($Q_{180}$) of said film in the machine direction after 30 minutes' treatment at 180° C. is not more than 1.3%.

3. A film according to claim 1 or claim 2, wherein the shrinkage ($Q_{180}$) of said film in the machine direction after 30 minutes' treatment at 180° C. is not more than 0.5%.

4. A process for producing a biaxially oriented polyester film simultaneously satisfying the following formulas (I) to (III):

$$|S_{180} - S_{120}| \leq 54 \quad (I)$$

$$T_s^{MD} \geq 100 \quad (II)$$

$$Q_{120} \leq 0.7 \quad (III)$$

wherein $S_{180}$ is shrinking stress (g/mm$^2$) of the film in the machine direction at 180° C., $S_{120}$ is shrinking stress (g/mm$^2$) of the film in the machine direction at 120° C., $T_s^{MD}$ is shrinkage initiation temperature (°C.) of the film in the machine direction, and $Q_{120}$ is shrinkage (%) of the film in the machine direction after 5 hours' treatment at 120° C., which comprises the steps:

extruding a polyester at a temperature from 270° to 300° C. into an amorphous sheet, stretching the sheet in the machine direction by a stretch ratio from 2.5 to 4.5 times at a temperature from 80° to 120° C., stretching the film in the transverse direction by a stretch ratio from 3.3 to 4.5 times at a temperature from 80° to 140° C., heat-setting the film at a temperature form 225° to 260° C. for from 1 sec to 10 min while permitting the film to relax in the transverse direction by a factor from 1 to 15% in a heat-setting zone, further permitting the film to relax in the machine direction or the transverse direction or both directions by a factor from 0.01 to 10% in a cooling zone at a temperature not exceeding 180° C., and winding up the biaxially oriented film thus heat-set.

5. A process according to claim 4, wherein the taken-up film is further subjected to off-line heat treatment at a temperature from 120° to 180° C. for from 10 sec to 10 min.

* * * * *